United States Patent
Yamauchi et al.

(10) Patent No.: US 12,212,198 B2
(45) Date of Patent: Jan. 28, 2025

(54) COIL, STATOR COMPRISING SAME, AND MOTOR

(71) Applicant: Panasonic Intellectual Property Management Co., Ltd., Osaka (JP)

(72) Inventors: Hirokazu Yamauchi, Osaka (JP); Yasuaki Matsushita, Kyoto (JP); Keiichiro Nukada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 17/757,714

(22) PCT Filed: Dec. 3, 2020

(86) PCT No.: PCT/JP2020/045040
§ 371 (c)(1),
(2) Date: Jun. 18, 2022

(87) PCT Pub. No.: WO2021/131575
PCT Pub. Date: Jul. 1, 2021

(65) Prior Publication Data
US 2023/0019262 A1    Jan. 19, 2023

(30) Foreign Application Priority Data
Dec. 27, 2019    (JP) ................................ 2019-237731

(51) Int. Cl.
*H02K 3/12* (2006.01)
*H02K 1/16* (2006.01)
(Continued)

(52) U.S. Cl.
CPC ................. *H02K 3/12* (2013.01); *H02K 1/16* (2013.01); *H02K 1/22* (2013.01); *H02K 7/003* (2013.01)

(58) Field of Classification Search
None
See application file for complete search history.

(56) References Cited

U.S. PATENT DOCUMENTS 7,969,273 B2 *   6/2011   Urano ................... H02K 3/522
                                                    336/198
8,610,328 B2 *  12/2013   Yoshida ................ H02K 3/522
                                                    310/194
(Continued)

FOREIGN PATENT DOCUMENTS

DE    102012212637    1/2014
JP    2000-197294 A   7/2000
(Continued)

OTHER PUBLICATIONS

The EPC Office Action dated May 24, 2023 for the related European Patent Application No. 20907104.2.
(Continued)

*Primary Examiner* — Bernard Rojas
(74) *Attorney, Agent, or Firm* — Rimon P.C.

(57) ABSTRACT

Provided is a coil including first and second lead parts, and a winding part. The winding part includes first to n-th turns. The winding part includes first and second coil ends. The first lead part extends from the first turn to the n-th turn along an upper surface of the first coil end. The second lead part extends from the n-th turn. The first and second lead parts include respective ends that are equal in height from the upper surface of the first coil end when viewed from a radial direction, and are equidistant from the n-th turn when viewed from an axial direction.

10 Claims, 12 Drawing Sheets

(51) Int. Cl.
    *H02K 1/22*          (2006.01)
    *H02K 7/00*          (2006.01)

(56) References Cited

U.S. PATENT DOCUMENTS

| | | |
|---|---|---|
| 2010/0194214 A1 | 8/2010 | Takahashi et al. |
| 2010/0201212 A1 | 8/2010 | Urano et al. |
| 2014/0070646 A1 | 3/2014 | Isoda et al. |
| 2015/0013149 A1 | 1/2015 | Hashimoto et al. |
| 2015/0128406 A1 | 5/2015 | Isoda et al. |

FOREIGN PATENT DOCUMENTS

| | | |
|---|---|---|
| JP | 2002-064028 A | 2/2002 |
| JP | 2009-089456 | 4/2009 |
| JP | 2013-005541 A | 1/2013 |
| JP | 2014-057403 | 3/2014 |
| WO | 2009/011459 | 1/2009 |
| WO | 2009/041172 | 4/2009 |

OTHER PUBLICATIONS

International Search Report of PCT application No. PCT/JP2020/045040 dated Feb. 22, 2021.

\* cited by examiner

FIG. 1
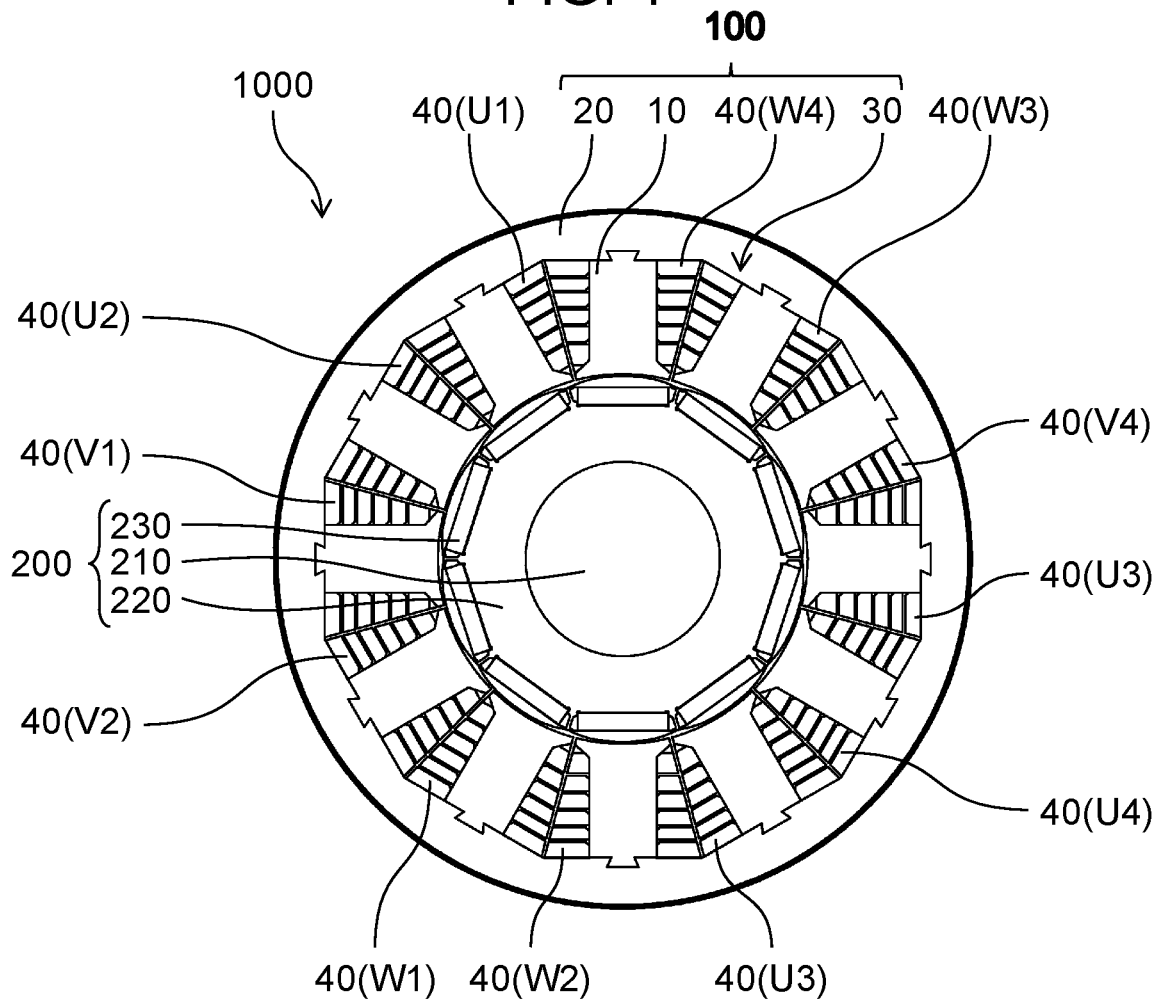
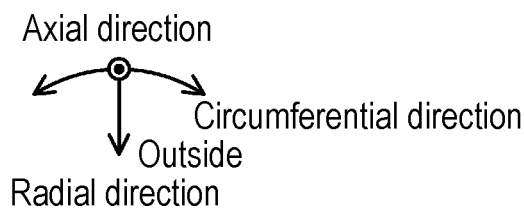

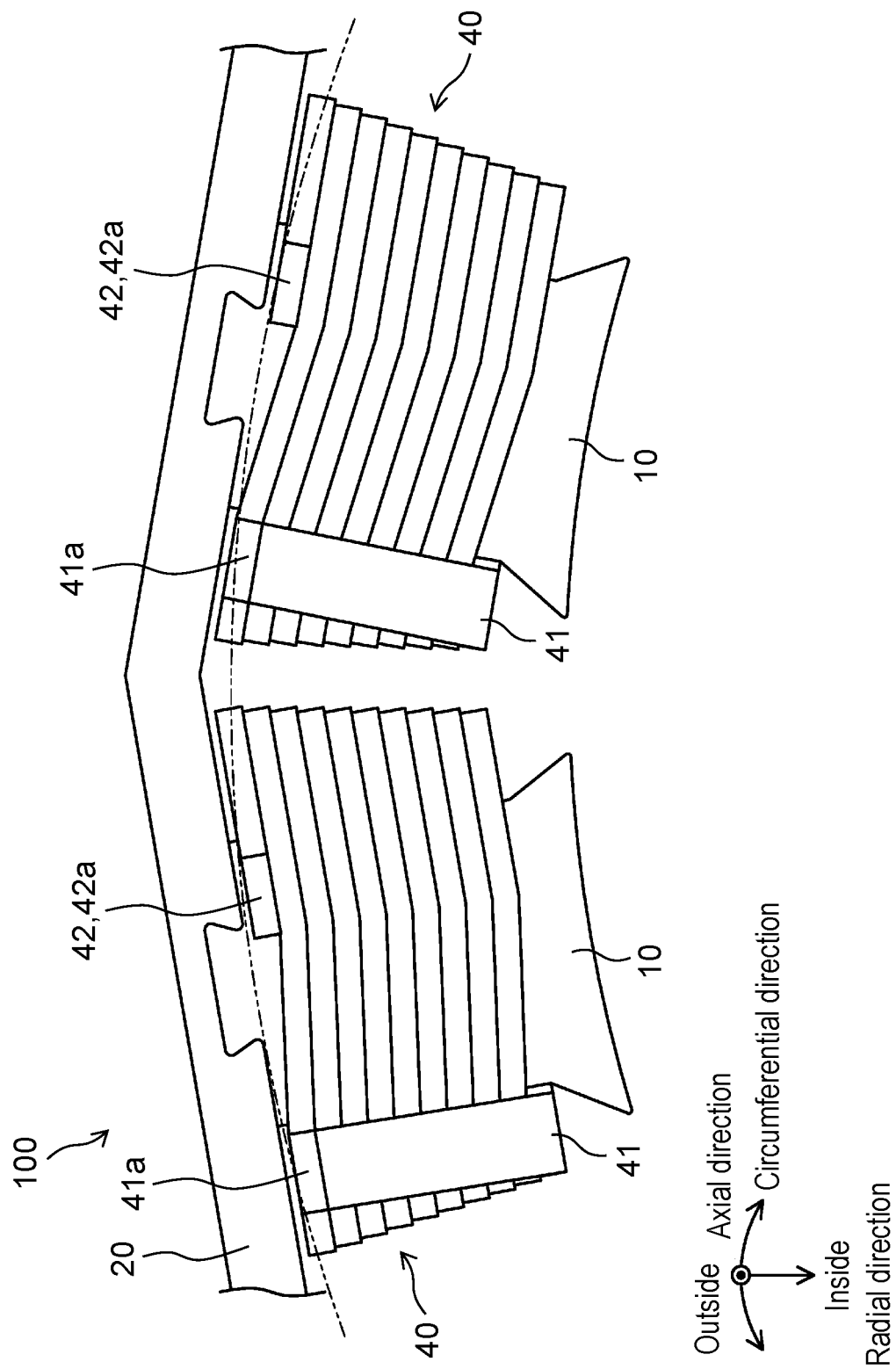

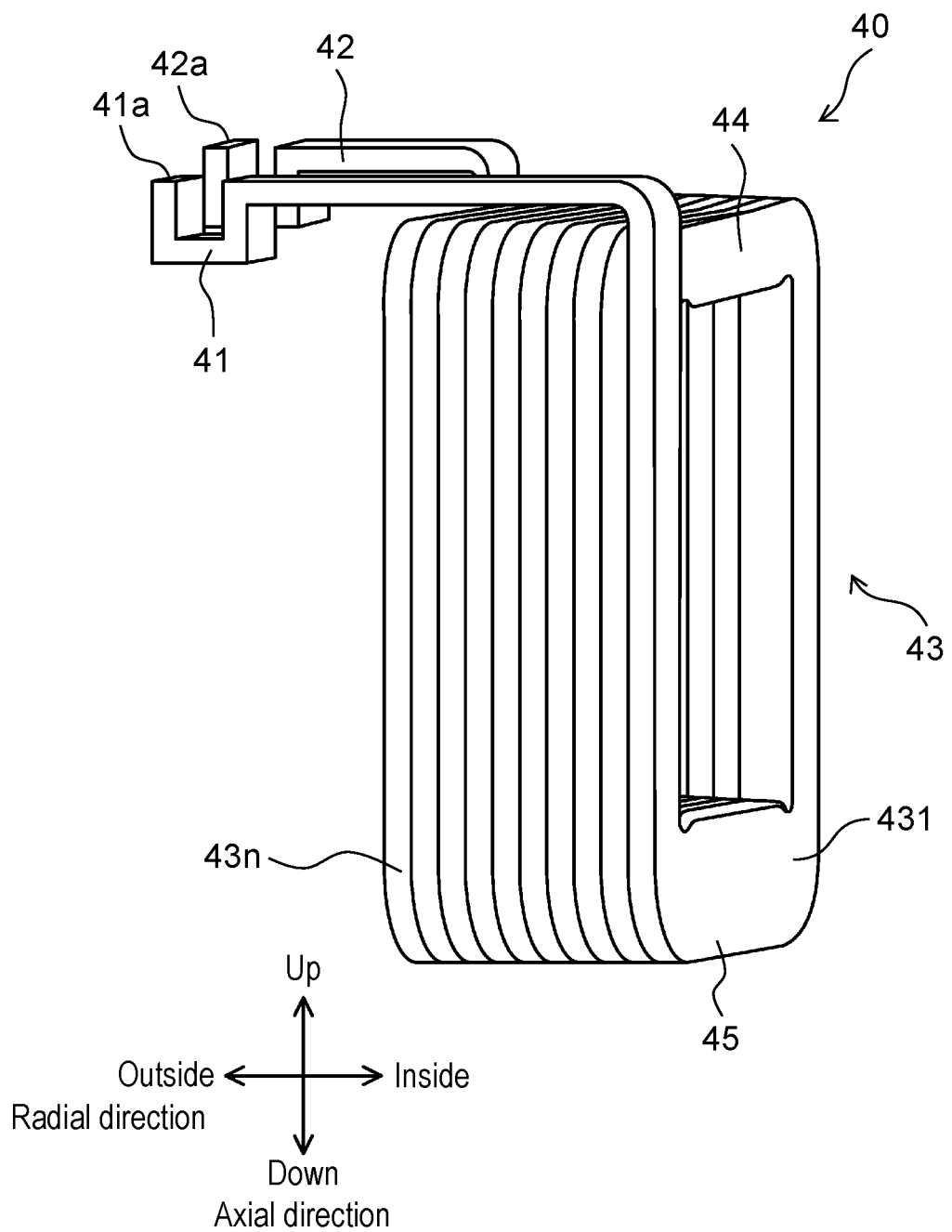

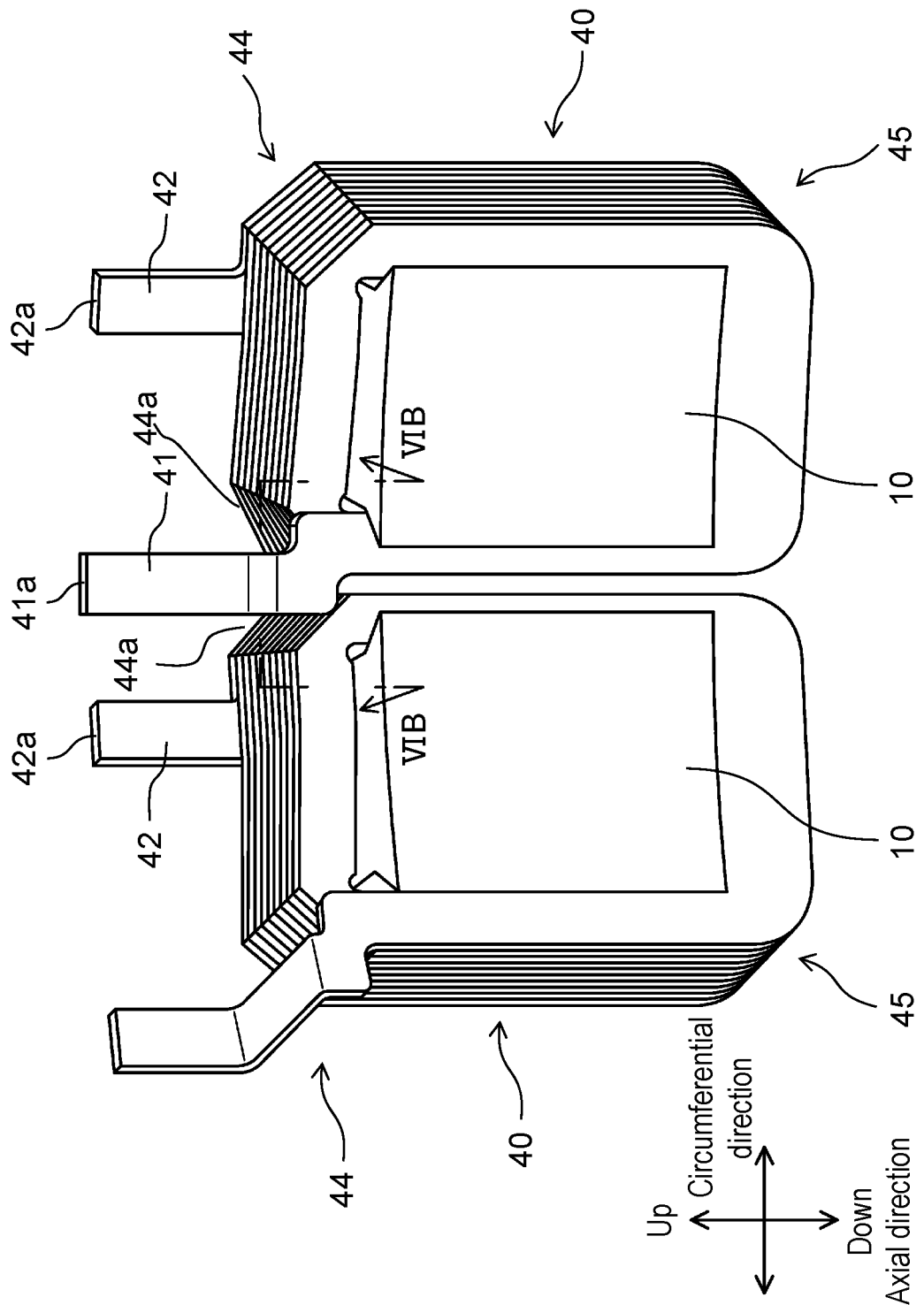

COIL, STATOR COMPRISING SAME, AND MOTOR

FIELD OF THE INVENTION

The present invention relates to a coil, particularly a molded coil, a stator, and a motor including the coil.

DESCRIPTION OF THE RELATED ART

In recent years, a demand for motors has increased in industrial and vehicle applications. In particular, the motors have been desired to be improved in efficiency and reduced in cost.

As one of methods for improving efficiency of a motor, improving a space factor of a coil disposed in a slot of a stator is known. Increasing the space factor of the coil enables reducing a loss due to a current flowing through the coil when the motor is driven.

As a method for improving a space factor of a coil, there is proposed a configuration in which a cast coil made of a copper material is disposed in a slot (e.g., see PTL 1).

Typical edgewise coils and the coil disclosed in PTL 1 each have a winding start and a winding end that are different in position in a radial direction of a motor. This causes a lead part extending from the winding start and a lead part extending from the winding end are not located at respective positions equidistant from a center of the motor, or are not located on the same circumference.

Unfortunately, such a configuration requires a jig and connection equipment to be frequently moved when different coils are connected to each other directly or with a bus bar or the like. Thus, connecting work is complicated. In particular, when a welding method is used as a connection method, a welding head is less likely to be accurately moved to a welding position while being frequently moved between lead parts having a narrow gap. Alternatively, to move a coil or a stator itself, equipment for moving the coil or the stator increases in size and is complicated. For this reason, the motor may be increased in assembly cost.

CITATION LIST

Patent Literature

PTL1: German Patent Application Publication No. 102012212637

SUMMARY OF THE INVENTION

The present invention is made in view of the above points. An object of the present invention is to provide a coil capable of facilitating connecting work to another member, and a stator and a motor including the coil.

To achieve the above object, a coil according to the present invention is attached to a motor in which a rotor rotates about an axis line as a rotation center, the coil including: a winding part including first to n-th (n is an integer of 2 or more) turns stacked in this order from a center side toward an outer peripheral side of the motor when viewed from a radial direction of the motor orthogonal to the axis line; a first lead part extending from the first turn; and a second lead part extending from the n-th turn, wherein the winding part includes a first coil end located on a first side in an axial direction in which the axis line extends and a second coil end located on a second side in the axial direction, the first lead part is bent to extend to the n-th turn along a surface of the first coil end, the surface being located on the first side, and the first and second lead parts include respective ends that are equal in height from the surface of the first coil end, the surface being located on the first side, when viewed from the radial direction, and the respective ends being equidistant from the n-th turn when viewed from the axial direction.

A stator according to the present invention includes a yoke in an annular shape, teeth connected to an inner periphery of the yoke, and coils wound around the respective teeth, the coils each being the coil according to the present invention, wherein first lead parts are provided in the respective coils are disposed at equal intervals along a circumferential direction of the motor, the first lead parts being the first lead part; and second lead parts that are provided in the respective coils are disposed at equal intervals along the circumferential direction, the second lead parts being the second lead part; the first lead parts each includes an end located at a height equal to a height of an end of each of the second lead parts when viewed from the radial direction, and the end of each of the first lead parts and the end of each of the second lead parts, are located on an identical circumference about an axial center of the yoke.

A motor according to the present invention includes at least a rotor provided at an axial center with an output shaft, and the stator provided coaxially with the rotor and at a predetermined interval from the rotor.

The coils of the present invention enable simple connections between the coils, and between each coil and a bus bar and the like. The coils also enable a connecting step to be standardized. The stator of the present invention enables a simple connection between coils that are adjacent to each other or separated from each other. The stators also enable a connecting step to be standardized. The motor of the present invention enables an assembly step of the stator to be standardized. The motor also enables reduction in assembly cost.

BRIEF DESCRIPTION OF THE DRAWINGS

FIG. 1 is a schematic diagram of a motor according to an exemplary embodiment of the present invention.

FIG. 3A illustrates a main part of a stator as viewed from above.

FIG. 5 is a perspective view of another coil according to the first modification.

FIG. 6A is a perspective view of a coil according to a second modification.

DETAILED DESCRIPTION OF THE PREFERRED EMBODIMENTS

Figure 2A:
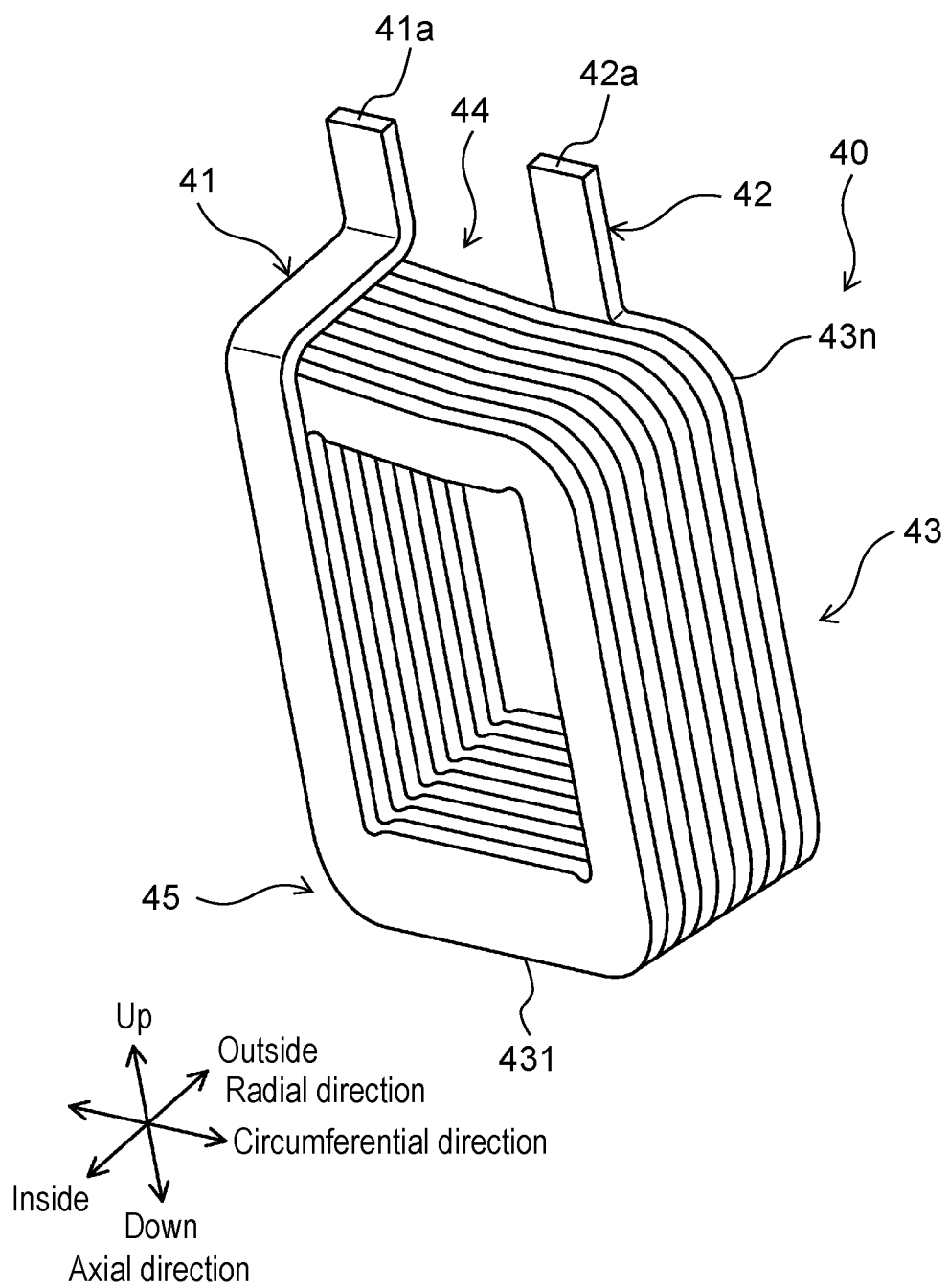
FIG. 2A is a perspective view of a coil as viewed from a first turn side.

Hereinafter, an exemplary embodiment of the present invention will be described in detail with reference to the drawings. Description of a preferable exemplary embodiment below is merely exemplary in nature and is not intended to limit the present invention, its applications, or its uses at all.

Exemplary Embodiment

[Configuration of Motor]

FIG. 1 is a schematic diagram of motor 1000 according to an exemplary embodiment of the present invention. In the following description, a radial direction of motor 1000 may be referred to as a "radial direction", an outer circumferential direction thereof may be referred to as a "circumferential direction", and an axis line direction of output shaft 210 of motor 1000 (a direction perpendicular to the paper surface in FIG. 1) may be referred to as an "axial direction". In the radial direction, an axial center side of motor 1000 may be referred to as radially inside, and an outer peripheral side may be referred to as radially outside. FIG. 1 does not illustrate first lead part 41 and second lead part 42 of coil 40 described later. When viewed from the axial direction, motor 1000 has an axial center aligning with an axis line of the output shaft 210.

Motor 1000 includes stator 100 and rotor 200. Although motor 1000 includes components other than the above components, such as a motor case and a bearing that rotatably supports the output shaft, illustration and description of those components are eliminated for convenience of description.

Stator 100 includes yoke 20 in an annular shape, teeth 10, slots 30, and coils 40. Teeth 10 are connected to an inner periphery of yoke 20 and are provided at equal intervals along the inner periphery. Slots 30 are provided between respective teeth 10 adjacent to each other in the circumferential direction. Coils 40 are accommodated in respective slots 30. Stator 100 is disposed radially outside rotor 200 at a predetermined interval from rotor 200.

Teeth 10 and yoke 20 are each formed by, for example, being blanked out from electromagnetic steel sheets containing silicon and the like after being stacked. Coils 40 are attached to respective teeth 10 with respective insulators 50 (see FIG. 3B) interposed therebetween and accommodated in respective slots 30. The shape of coil 40 will be described in detail later.

Corresponding to a phase of a current flowing through coil 40, coils may be referred to as coils U1 to U4, V1 to V4, or W1 to W4.

Rotor 200 includes output shaft 210, rotor core 220 provided at its axial center with output shaft 210, and magnets 230 that are embedded in rotor core 220 while facing stator 100 and that have N poles and S poles alternately disposed along an outer peripheral direction of the output shaft. Material, shape, and properties of magnet 230 can be appropriately changed in accordance with an output of motor 1000, for example. Rotor core 220 is formed by, for example, being blanked out from electromagnetic steel sheets containing silicon and the like after being stacked.

Coils U1 to U4, V1 to V4, and W1 to W4 are independently connected in series. Three phase currents of U, V, and W phases different in phase by an electrical angle of 120° are supplied to coils U1 to U4, V1 to V4, and W1 to W4, respectively, and excited, thereby generating a rotating magnetic field in stator 100. The rotating magnetic field and a magnetic field generated by magnets 230 provided in rotor 200 interact with each other to generate torque, and thus output shaft 210 is rotated while being supported by a bearing (not illustrated).

Figure 2B:
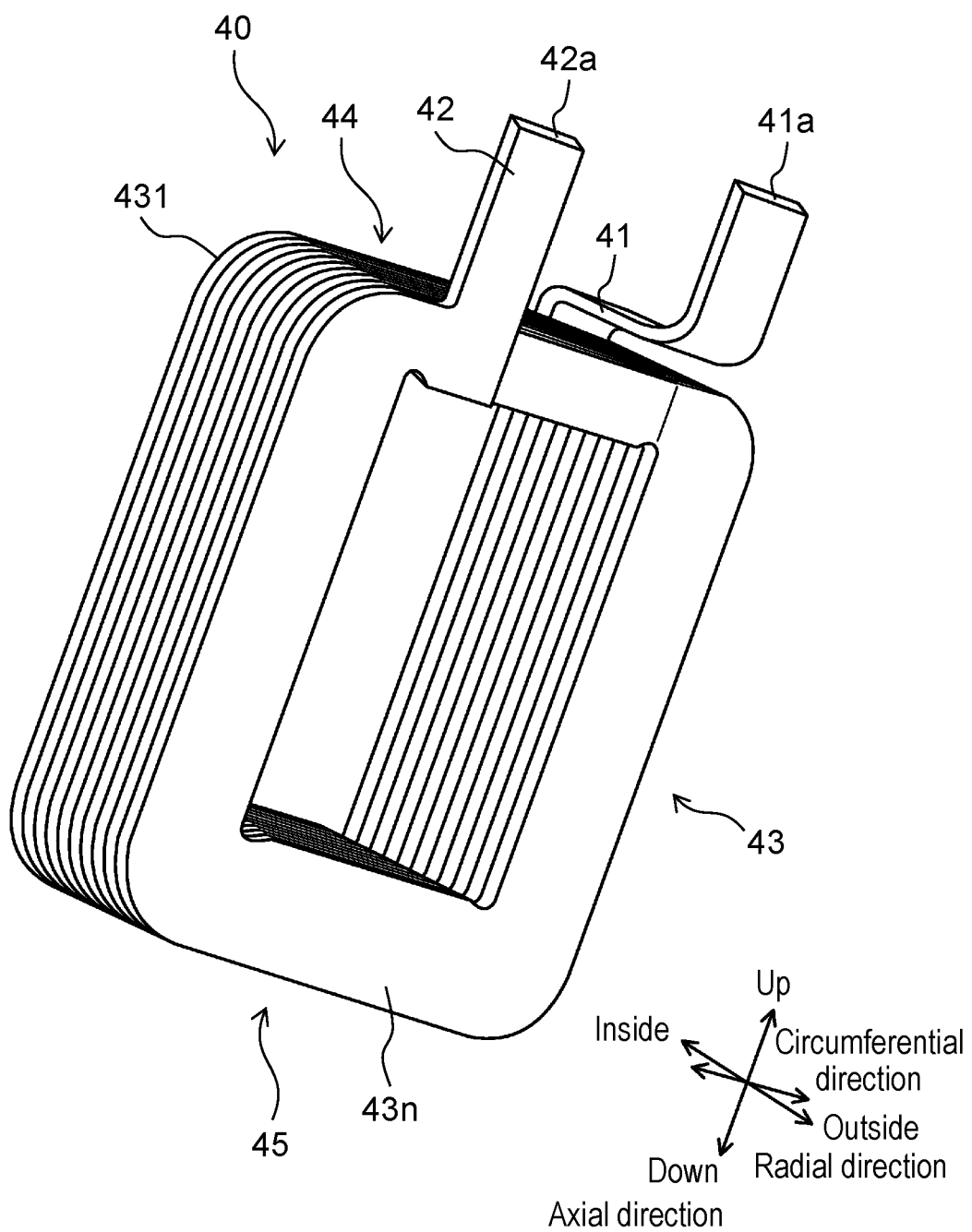
FIG. 2B is a perspective view of a coil as viewed from an n-th turn side.
Figure 3B:
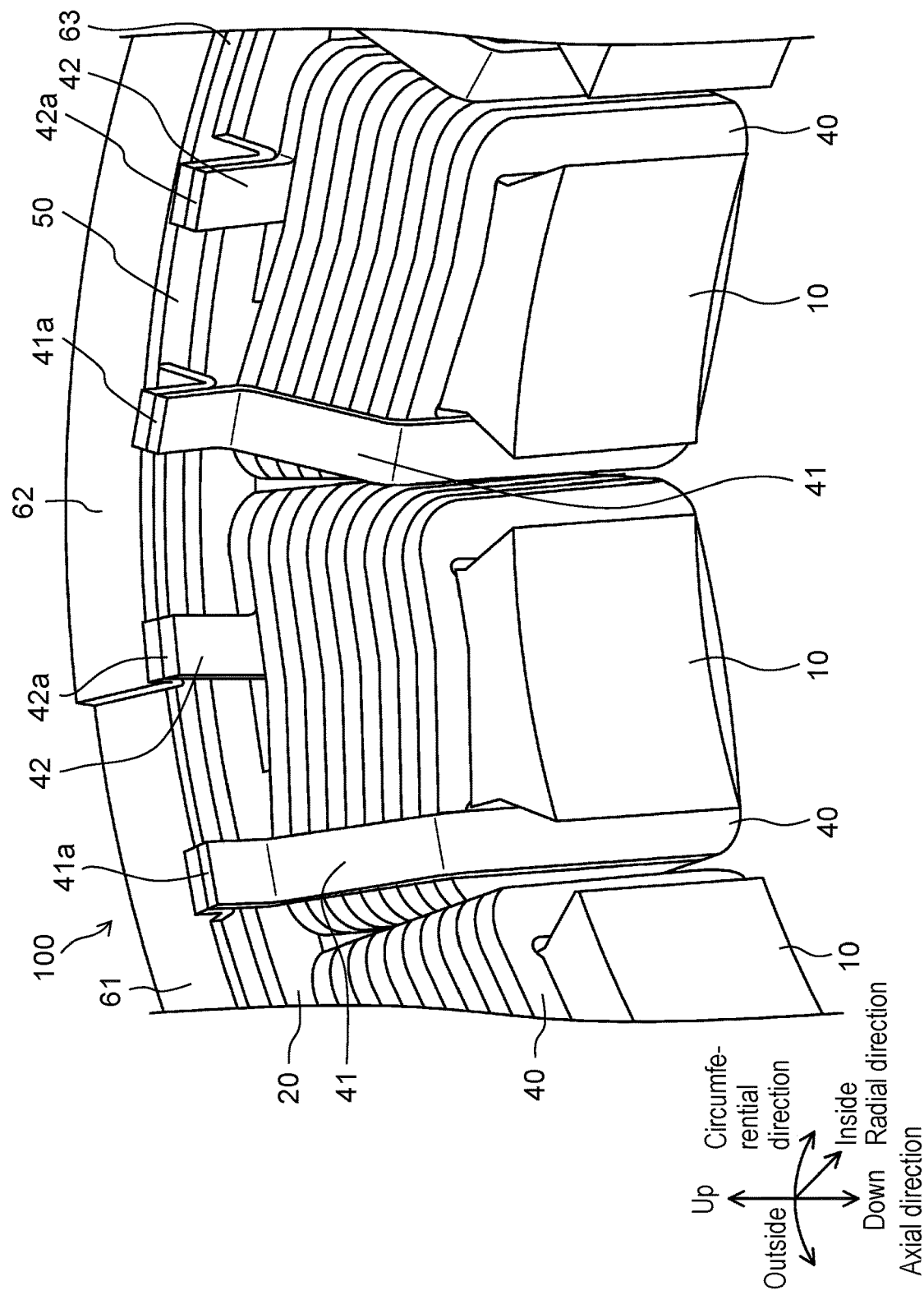
FIG. 3B illustrates a main part of a stator as viewed from radially inward.
Figure 3C:
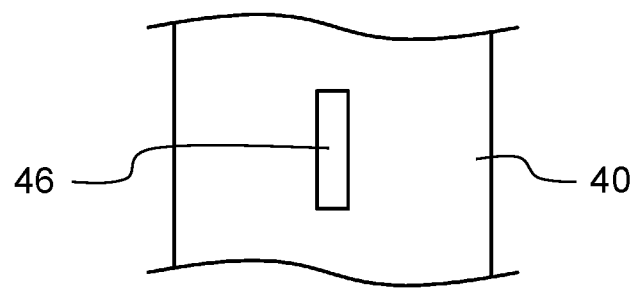
FIG. 3C is an enlarged view of a main part of a plate.
Figure 3D:
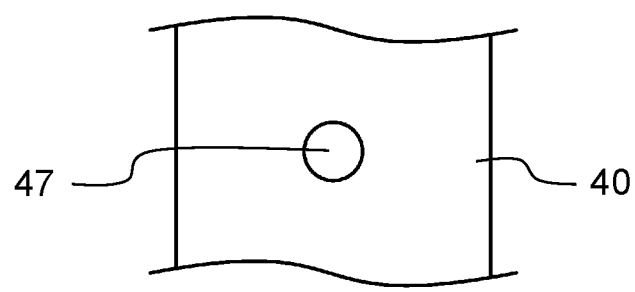
FIG. 3D is another enlarged view of a main part of a plate.
Figure 3E:
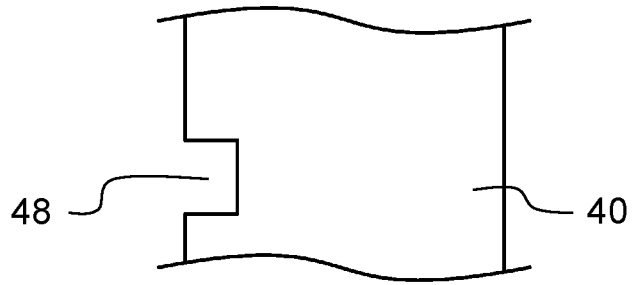
FIG. 3E is yet another enlarged view of a main part of a plate.

[Structure of coil and main part of stator] FIG. 2A is a perspective view of a coil as viewed from a first turn side. FIG. 2B is a perspective view of the coil as viewed from an n-th turn side. FIG. 3A illustrates a main part of a stator as viewed from above. FIG. 3B illustrates the main part of the stator as viewed from radially inward. FIG. 3C is an enlarged view of a main part of a plate. FIG. 3D is another enlarged view of a main part of the plate. FIG. 3E is yet another enlarged view of a main part of the plate.

As illustrated in FIGS. 2A and 2B, coil 40 includes first lead part 41, second lead part 42, and winding part 43. Coil 40 is a molded coil formed with a conductive wire made of copper or the like having a quadrangular section. The conductive wire constituting coil 40 is provided on its surface with an insulating film (not illustrated). Similarly, an insulating member such as an insulator or an insulating sheet (not illustrated) is provided between tooth 10 and coil 40 illustrated in FIGS. 3A and 3B.

The "molded coil" in the present description does not include a coil obtained by only spirally winding a conductive wire having a constant width and thickness.

The molded coil is formed by, for example, preparing rectangular plates different in length, width, or thicknesses, pressing the plates, and joining the plates by cold welding, welding, or another method. The plate is made of a material that is a low-resistance material such as copper or aluminum. The plate formed partially in a different shape can be prepared by performing the following processing. For example, slit 46 or hole 47 is formed in the plate as illustrated in FIG. 3C or 3D. Alternatively, cutout 48 is formed in the plate as illustrated in FIG. 3E.

Alternatively, the molded coil may be formed by so-called casting in which copper or the like is melted and poured into a casting mold. The molded coil may be formed by bending a conductive wire in a plate shape at a predetermined position, the conductive wire being preliminarily formed to be different in width or thicknesses midway. Alternatively, a conductive wire in a plate shape having a constant width and thickness may be rolled at a predetermined place, and wound in a spiral shape after being changed in width and thickness midway to form a molded coil. In short, the molded coil is formed by winding a conductive wire and further performing another processing on the conductive wire, or by a method different from a method in which the conductive wire is simply wound.

Winding part 43 includes first to n-th turns 431 to 43n formed by spirally winding a conductive wire. Here, n is an integer of two or more. First to n-th turns 431 to 43n are stacked in this order from a center side toward an outer peripheral side of motor 1000 and accommodated in slot 30. Each of first to n-th turns 431 to 43n has a quadrangular ring shape having four sides when viewed from the radial direction.

Winding part 43 includes first coil end 44 and second coil end 45. First coil end 44 corresponds to an upper end side in the axial direction among the four sides of first to n-th turns 431 to 43n. Second coil end 45 corresponds to a lower end side portion in the axial direction among the four sides of first to n-th turns 431 to 43n.

First lead part 41 is continuous with an end of first turn 431. First lead part 41 is bent at the end of first turn 431 to extend to n-th turn 43n along an upper surface of first coil end 44. First lead part 41 is further bent upward near n-th turn 43n.

Second lead part 42 is continuous with n-th turn 43n, and is bent in the middle of n-th turn 43n to extend upward from first coil end 44.

As illustrated in FIGS. 2A to 3B, end 41a of first lead part 41 (hereinafter, simply referred to as end 41a) and end 42a of second lead part 42 (hereinafter, simply referred to as end 42a) are disposed with a predetermined distance along the circumferential direction. In this case, the predetermined distance is shorter than a circumferential length of a part of first coil end 44 corresponding to n-th turn 43n.

When viewed from the axial direction, end 41a and end 42a are disposed at positions equidistant from the center of motor 1000. Specifically, when viewed from above, end 41a and end 42a are disposed on the same circumference centered on the axial center of yoke 20, corresponding to the center of motor 1000. In other words, when viewed from the axial direction, end 41a and end 42a are disposed radially equidistant from the outermost periphery of first coil end 44, that is, from n-th turn 43n.

End 41a and end 42a are disposed at the same height from the upper surface of first coil end 44 when viewed from the radial direction. Specifically, first lead part 41 and second lead part 42 are equal in length extending axially upward from the upper surface of first coil end 44.

In the present application description, "identical", "equal", and "the same" include a manufacturing tolerance or an assembly tolerance of each component constituting motor 1000, and do not mean that comparison targets are identical, equal, or the same in a strict sense.

First lead part 41 and second lead part 42 are identical in shape in a part extending from n-th turn 43n. Specifically, first lead part 41 and second lead part 42 are equal in width. First lead part 41 and second lead part 42 are equal in thickness.

In general, slot 30 has a circumferential width increasing from a side closer to yoke 20 toward rotor 200. According to the shape of slot 30, n-th turn 43n has a wider width than first turn 431 in winding part 43 of coil 40.

First lead part 41 is formed equal in width to first turn 431. Second lead part 42 is formed narrower than n-th turn 43n by being formed equal in width to first lead part 41 as described above.

As illustrated in FIGS. 1, 3A, and 3B, coils 40 are disposed at equal intervals along the inner periphery of yoke 20 corresponding to placement of teeth 10. According to this placement relationship, first lead parts 41 provided in respective coils 40 are disposed at equal intervals along the circumferential direction. Similarly, second lead parts 42 provided in respective coils 40 are disposed at equal intervals along the circumferential direction. An interval between first lead part 41 and second lead part 42 along the circumferential direction is equal for each coil 40.

When viewed from the radial direction, end 41a provided in each of coils 40 and end 42a provided in each of coils 40 are located at the same height. For example, ends 41a and ends 42a are located at the same height with respect to the upper surface of first coil end 44.

Each of first lead part 41 and second lead part 42 provided in one coil 40 functions as a connection part to another coil 40. Alternatively, each of first lead part 41 and second lead part 42 functions as a connection part to corresponding one of bus bars 61 to 63 (see FIG. 3B), and to wiring. For example, when coils 40 of the same U phase described above are connected by welding, corresponding bus bars 61 to 63 (see FIG. 3B) or the wiring is welded to first lead part 41 and second lead part 42 provided in each of coils 40. Thus, the insulating film is removed from a part of first lead part 41, the part including end 41a. Similarly, the insulating film is removed from a part of second lead part 42, the part including end 42a. Winding part 43 further functions as a magnetic field generator when a current flows therethrough.

[Effects and others] As described above, coil 40 according to the present exemplary embodiment is attached to motor 1000. Coil 40 includes first lead part 41, second lead part 42, and winding part 43.

Winding part 43 includes first to n-th (n is an integer of two or more) turns 431 to 43n stacked in this order from the center side toward the outer peripheral side of motor 1000 when viewed from the radial direction. Winding part 43 includes first coil end 44 located on its upper side in the axial direction and second coil end 45 located on its lower side in the axial direction.

First lead part 41 extends from first turn 431. Second lead part 42 extends from n-th turn 43n.

First lead part 41 is bent to extend to the n-th turn 43n along the upper surface of first coil end 44. End 41a and end 42a are equal in height from the upper surface of first coil end 44 when viewed from the radial direction, and are equidistant from the outermost periphery of first coil end 44, or n-th turn 43n when viewed from the axial direction. Coil 40 is the above described molded coil formed by forming a conductive wire.

Forming coil 40 as described above enables facilitating connection between coils 40. In particular, end 41a and end 42a are identical in position when viewed from the radial direction and when viewed from the axial direction, so that a jig or the like does not need to be complicatedly moved when coils 40 are connected by welding or the like. Additionally, a conductive wire does not need to be manually routed to a welding position. As a result, connection equipment and an assembly step of motor 1000 can be standardized, and assembly cost of motor 1000 can be reduced.

Using the molded coil as coil 40 enables increasing a degree of freedom in shape design. As a result, first lead part 41 and second lead part 42, and thus end 41a and end 42a can be disposed at appropriate positions suitable for shapes of stator 100 and motor 1000, so that connection between coils 40 can be facilitated.

Second lead part 42 extends upward along the axial direction to allow end 42a to be located above first coil end 44. First lead part 41 is further bent upward near n-th turn 43n.

Coil 40 formed as described above enables first lead part 41 and second lead part 42, which are connection parts, to be disposed above coil 40. Additionally, a jig, a welding head, and the like can be easily moved to connect coils 40. As a result, the connection between coils 40 can be facilitated.

First lead part 41 and second lead part 42 are preferably identical in shape in a part extending from n-th turn 43n. Specifically, first lead part 41 and second lead part 42 are preferably equal in thickness in the part extending from n-th turn 43n. First lead part 41 and second lead part 42 are preferably equal in width that is in the circumferential direction in this case.

This structure does not require a jig, equipment placement, and the like to be changed between first lead part 41 and second lead part 42 when first lead part 41 and second lead part 42 are connected to corresponding bus bars 61 to 63 or the wiring, so that a connecting step can be standardized. Additionally, welding conditions can be uniformed to connect first lead part 41 and second lead part 42 to corresponding bus bars 61 to 63 or the wiring by welding, so that a welding step can be standardized.

Stator 100 includes at least yoke 20 in an annular shape, teeth 10 connected to an inner periphery of yoke 20, and coils 40 wound around respective teeth 10.

First lead parts 41 provided in respective coils 40 are disposed at equal intervals along the circumferential direction. Second lead parts 42 provided in respective coils 40 are disposed at equal intervals along the circumferential direction. When viewed from the radial direction, end 41a is located at the same height as end 42a. When viewed from the axial direction, end 41a and end 42a are located on the same circumference about the axial center of yoke 20.

Ends 41a, 42a each have a height with respect to a reference position that is an axial upper end surface of insulator 50 or an insulating sheet (not illustrated) attached to tooth 10. As described above, the axial center of yoke 20 corresponds to the center of motor 1000.

Stator 100 formed as described above allows positions of first lead part 41 and second lead part 42 to be regularly fixed in stator 100. This structure enables facilitating connection between coils 40 different from each other or between coils 40 and corresponding bus bars 61 to 63. The coils also enable a connecting step to be standardized.

In particular, welding work between coils 40 different from each other or between coils 40 and corresponding bus bars 61 to 63 is performed by rotating stator 100 at equal intervals, or for each placement pitch of coils 40 in this case, under conditions where stator 100 is rotatably held about the axial center of yoke 20. As a result, the welding work can be greatly simplified.

The positions of first lead part 41 and second lead part 42 in stator 100 are regularly fixed, so that a place other than a connecting part can be easily masked during connecting work. For example, when a place other than a welding place is covered with a cover or the like (not illustrated) during the welding work between first lead part 41 or second lead part 42 and corresponding bus bars 61 to 63, spatters or the like generated during welding can be prevented from scattering to the periphery and damaging the insulating film on coil 40. This structure enables preventing an unintended short-circuit between coils 40, between coils 40 and teeth 10, or between coils 40 and yoke 20, so that an initial defect of stator 100 can be suppressed. As a result, assembly cost of stator 100 can be reduced. Additionally, quality of stator 100 can be maintained.

Stator 100 of the present exemplary embodiment enables connecting work between adjacent coils 40 to be facilitated. As a result, when motor 1000 is of a delta connection type, for example, welding between adjacent coils 40 can be facilitated. Thus, assembly work of stator 100 can be simplified.

Motor 1000 according to the present exemplary embodiment includes at least rotor 200 provided at its axial center with output shaft 210, and stator 100 provided coaxially with rotor 200 and at a predetermined interval from rotor 200.

Motor 1000 of the present exemplary embodiment enables facilitating connecting work between coils 40 or between coils 40 and corresponding bus bars 61 to 63 or the like, and enables a connecting step to be standardized. As a result, the assembly cost of stator 100 and thus of motor 1000 can be reduced. Additionally, quality of motor 1000 can be maintained.

As described above, coil 40 of the present exemplary embodiment is attached to motor 1000 in which rotor 200 rotates about the axis line, and includes winding part 43 including first to n-th (n is an integer of two or more) turns stacked in this order from the center side toward the outer peripheral side of motor 1000 when viewed from the radial direction of motor 1000 orthogonal to the axis line, first lead part 41 extending from the first turn, and second lead part 42 extending from the n-th turn. Winding part 43 includes first coil end 44 located on a first side in the axial direction in which the axis line extends, and second coil end 45 located on a second side in the axial direction. First lead part 41 is bent to extend to the n-th turn along a surface of first coil end 44, the surface being located on the first side, and end 41a of first lead part 41 and end 42a of second lead part 42 are equal in height from the surface of first coil end 44, the surface being located on the first side, when viewed from the radial direction, and are equidistant from the n-th turn when viewed from the axial direction.

This structure enables simple connections between the coils, and between each coil and a bus bar and the like. The coils also enable a connecting step to be standardized.

Second lead part 42 preferably extends toward the first side along the axial direction and includes an end located on the first side of first coil end 44, and first lead part 41 is preferably further bent toward the first side near the n-th turn.

Second lead part 42 is preferably bent toward the outer peripheral side of motor 1000 near the surface of first coil end 44, the surface being located on the first side.

First lead part 41 is preferably equal in thickness to second lead part 42, and is preferably equal in width to second lead part 42.

Stator 100 of the present exemplary embodiment includes yoke 20 in an annular shape, teeth 10 connected to an inner periphery of yoke 20, and coils 40 wound around respective teeth 10, coils 40 being each the coil of the present exemplary embodiment described above, and coils 40 including: first lead parts 41 that are provided in respective coils 40 and that are disposed at equal intervals along a circumferential direction of motor 1000; and second lead parts 42 that are provided in respective coils 40 and that are disposed at equal intervals along the circumferential direction, first lead parts 41 each including end 41a located at a height equal to a height of end 42a of each of second lead parts 42 when viewed from the radial direction, and end 41a of each of first lead parts 41 and end 42a of each of second lead parts 42, being located on an identical circumference about the axial center of yoke 20.

This structure enables a simple connection between coils that are adjacent to each other or separated from each other. The coils also enable a connecting step to be standardized.

First lead parts 41 and corresponding second lead parts 42 are preferably disposed at equal intervals.

Motor 1000 of the present exemplary embodiment includes at least rotor 200 provided at its axial center with output shaft 210, and stator 100 of the present exemplary embodiment described above, stator 100 being provided coaxially with rotor 200 and at a predetermined interval from rotor 200.

This structure enables an assembly step of the stator to be standardized. This structure also enables reduction in assembly cost.

<First Modification>

Figure 4:
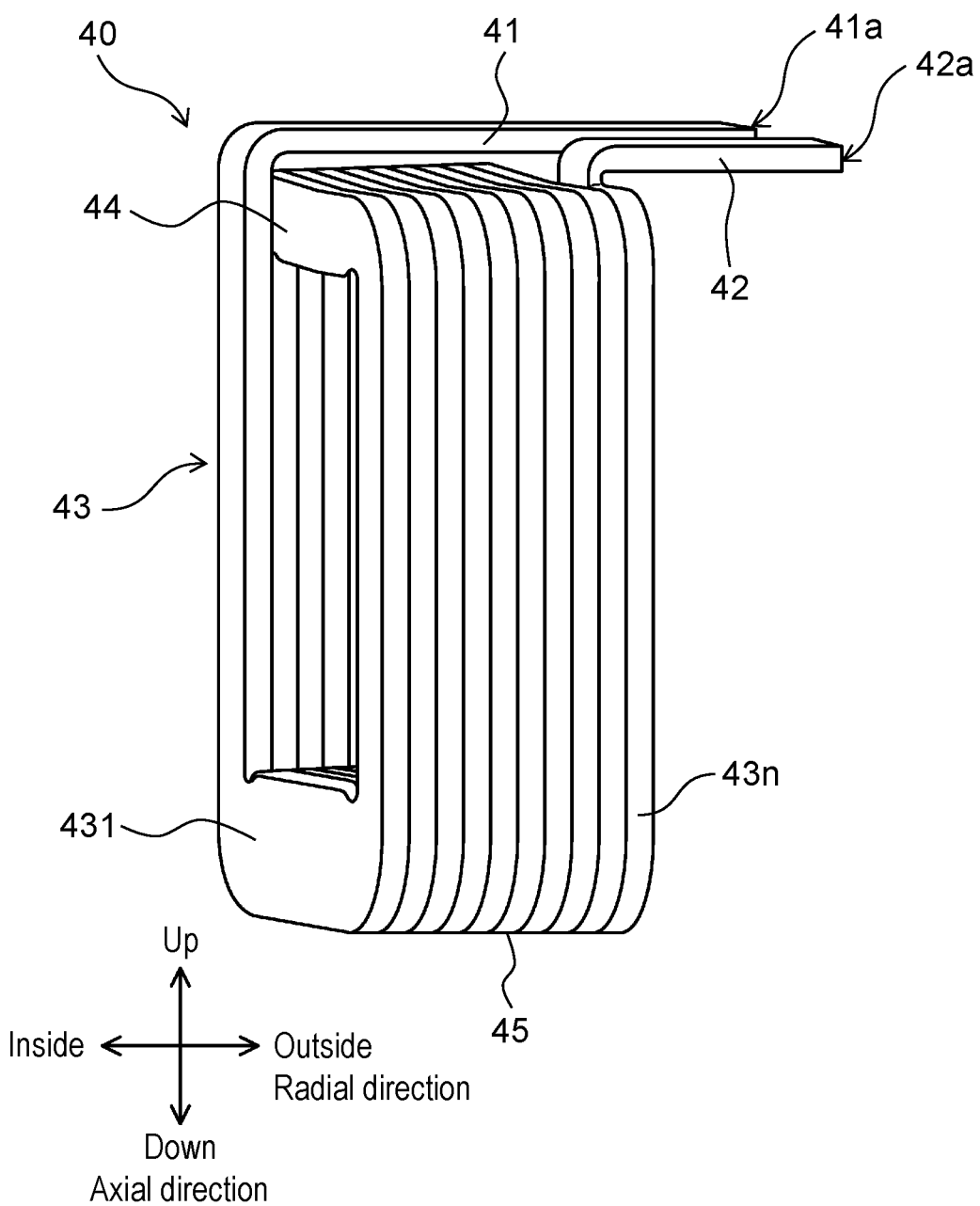
FIG. 4 is a perspective view of a coil according to a first modification.

FIG. 4 is a perspective view of a coil according to a first modification. FIG. 5 is a perspective view of another coil according to the first modification. In FIGS. 4 and 5, and the subsequent drawings, a part similar to that of the exemplary embodiment is denoted by the same reference numeral, and detailed description thereof will be eliminated.

The present modification shows a structure that is different from the structure shown in the exemplary embodiment in the following points.

Second lead part 42 is bent in the middle of n-th turn 43n to extend radially outward. First lead part 41 is bent at an end of first turn 431 to extend radially outward of n-th turn 43n along an upper surface of first coil end 44.

First lead part 41 and second lead part 42 both extend along the radial direction, and end 41a and end 42a are on the same circumference centered on the axial center of yoke 20. In this case, end 41a and end 42a are at respective positions that are identical and radially outward of coil 40. As illustrated in FIG. 4, end 41a and end 42a are substantially equal in height when viewed from the axial direction. In this case, end 41a and end 42a are at respective positions that are closer to the upper surface of first coil end 44 than those in the structure shown in the exemplary embodiment and that are identical axially.

When coil 40 is formed as described above, height of each of end 41a and end 42a as viewed from the radial direction can be reduced to lower than that in the structure shown in the exemplary embodiment. As a result, coil 40 including a connection part can be reduced in height.

When end 41a and end 42a are disposed radially outward of n-th turn 43n of coil 40, a space can be secured above first coil end 44. As a result, wiring and a bus bar, which are not illustrated, can be disposed above first coil end 44. Thus, coil 40 including the wiring and the bus bar can be reduced in height and size.

In particular, when there is a margin in a space between n-th turn 43n corresponding to the radially outermost side of coil 40 and yoke 20 or a motor case (not illustrated) accommodating stator 100 and rotor 200, the structure shown in the present modification is effective in reducing coil 40 in height and size.

When end 41a and end 42a are desired to be exactly equal in distance in the radial direction from n-th turn 43n that is the outermost periphery of first coil end 44 as viewed from the axial direction, first lead part 41 extending radially outward from n-th turn 43n may be bent downward in the middle, for example. As illustrated in FIG. 5, first lead part 41 extending radially outward of n-th turn 43n may be further bent multiple times along the upper surface of first coil end 44. That is, when viewed from the axial direction, first lead part 41 and second lead part 42 are bent downward to extend radially outward, and are further bent upward in the axial direction.

End 41a is located at the same height as the upper surface of first coil end 44 when viewed from the radial direction. End 42a is located at the same height as end 41a when viewed from the radial direction.

When coil 40 is formed as described above, height of each of end 41a and end 42a as viewed from the radial direction can be reduced to lower than that in the structure shown in the first modification. Thus, welding in the axial direction can be reduced in height. As a result, coil 40 including a connection part can be reduced in height.

When end 41a and end 42a are disposed radially outward of n-th turn 43n of coil 40, a space can be secured above first coil end 44. As a result, wiring and a bus bar, which are not illustrated, can be disposed above first coil end 44. Thus, coil 40 including the wiring and the bus bar can be reduced in height and size.

In particular, when there is a margin in a space between n-th turn 43n corresponding to the radially outermost side of coil 40 and yoke 20 or a motor case (not illustrated) accommodating stator 100 and rotor 200, the structure shown in the present modification is effective in reducing coil 40 in height and size.

End 41a may be flush with the upper surface of first coil end 44 or located below the upper surface when viewed from the radial direction. In this case, second lead part 42 may be bent downward from an end of n-th turn 43n to extend radially outward, thereby allowing end 42a to be equal in height to end 41a when viewed from the radial direction.

As described above, coil 40 of the present modification may be configured such that first lead part 41 extends outward of the n-th turn when viewed from the radial direction and is bent multiple times outside the n-th turn.

<Second Modification>

Figure 6B:
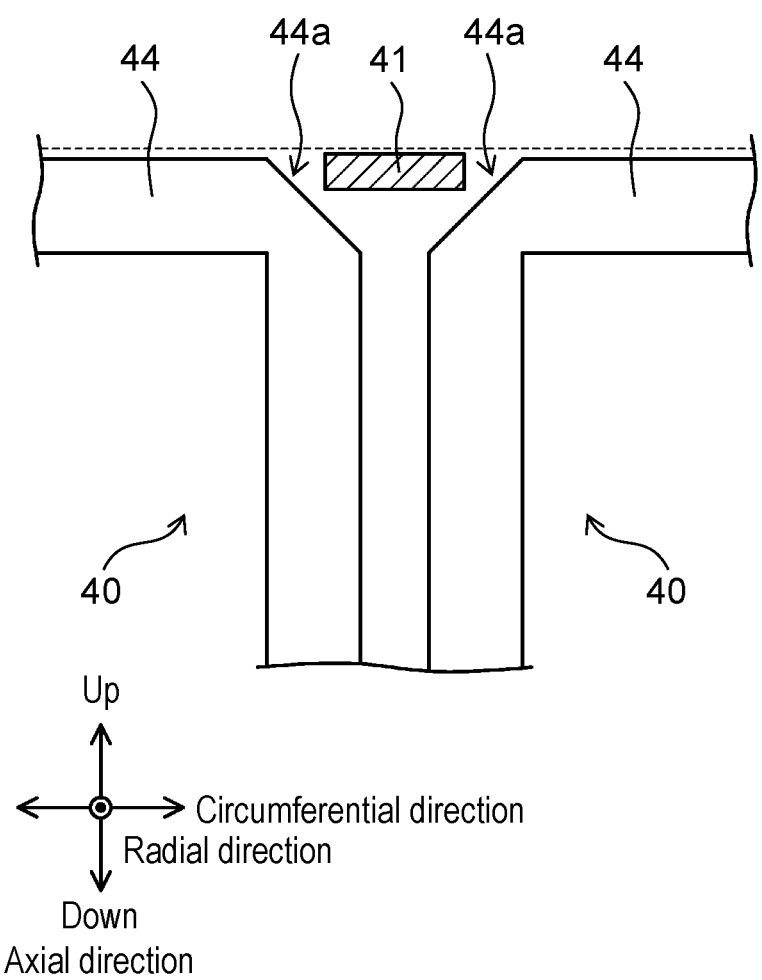
FIG. 6B is a schematic sectional view taken along line VIB-VIB in FIG. 6A.

FIG. 6A is a perspective view of a coil according to a second modification. FIG. 6B is a schematic sectional view taken along line VIB-VIB in FIG. 6A. The present modification shows a structure that is different from the structure shown in the exemplary embodiment in the following points.

Coils 40 adjacent to each other in the circumferential direction include first coil ends 44 facing each other in which corners 44a are chamfered. First lead part 41 extends to n-th turn 43n through between corners 44a of respective first coil ends 44, and is bent upward near n-th turn 43n.

When coil 40 is formed as described above, height of end 41a as viewed from the radial direction can be reduced to lower than that in the structure shown in the exemplary embodiment. As a result, coil 40 including a connection part can be reduced in height.

When first lead part 41 is disposed between corners 44a of first coil ends 44 facing each other in the circumferential direction, a space can be secured above first coil ends 44. As a result, wiring and a bus bar can be disposed above first coil end 44, so that coil 40 including the wiring and the bus bar can be reduced in height and size.

First coil end 44 includes corner 44a that has a larger sectional area than other parts of first to n-th turns 431 to 43n. Thus, even when corner 44a has a chamfered shape, coil 40 hardly increases in resistance to enable suppressing an increase in loss when a current flows through coil 40.

Corner 44a of first coil end 44 may have a linearly chamfered shape as illustrated in FIG. 6A. Alternatively, corner 44a of first coil end 44 may have, for example, a round chamfered shape. Corner 44a has a rounded shape in the latter case, so that damage or the like to the insulating film of first lead part 41 can be suppressed, for example. The latter case also enables stress concentration on corner 44a to be relieved.

Coils 40 shown in the present modification are attached to respective teeth 10 illustrated in FIG. 1 to constitute stator 100.

According to the present modification, coil 40 is reduced in height and size. Thus, stator 100 itself can be downsized in the axial direction. When corner 44a of first coil end 44 has a round chamfered shape, damage or the like to the insulating film of first lead part 41 can be suppressed. Thus, a leak current from coil 40 to tooth 10 or yoke 20 can be suppressed. As a result, a decrease in strength of a rotating magnetic field generated in stator 100 can be suppressed.

As described above, stator 100 of the present modification may be configured such that coils 40 adjacent to each other include first coil ends 44 facing each other and having corners 44a in a chamfered shape, and first lead part 41 is accommodated between corners 44a of first coil ends 44 facing each other and extends to the n-th turn or extends radially outward of the n-th turn.

<Third Modification>

Figure 7:
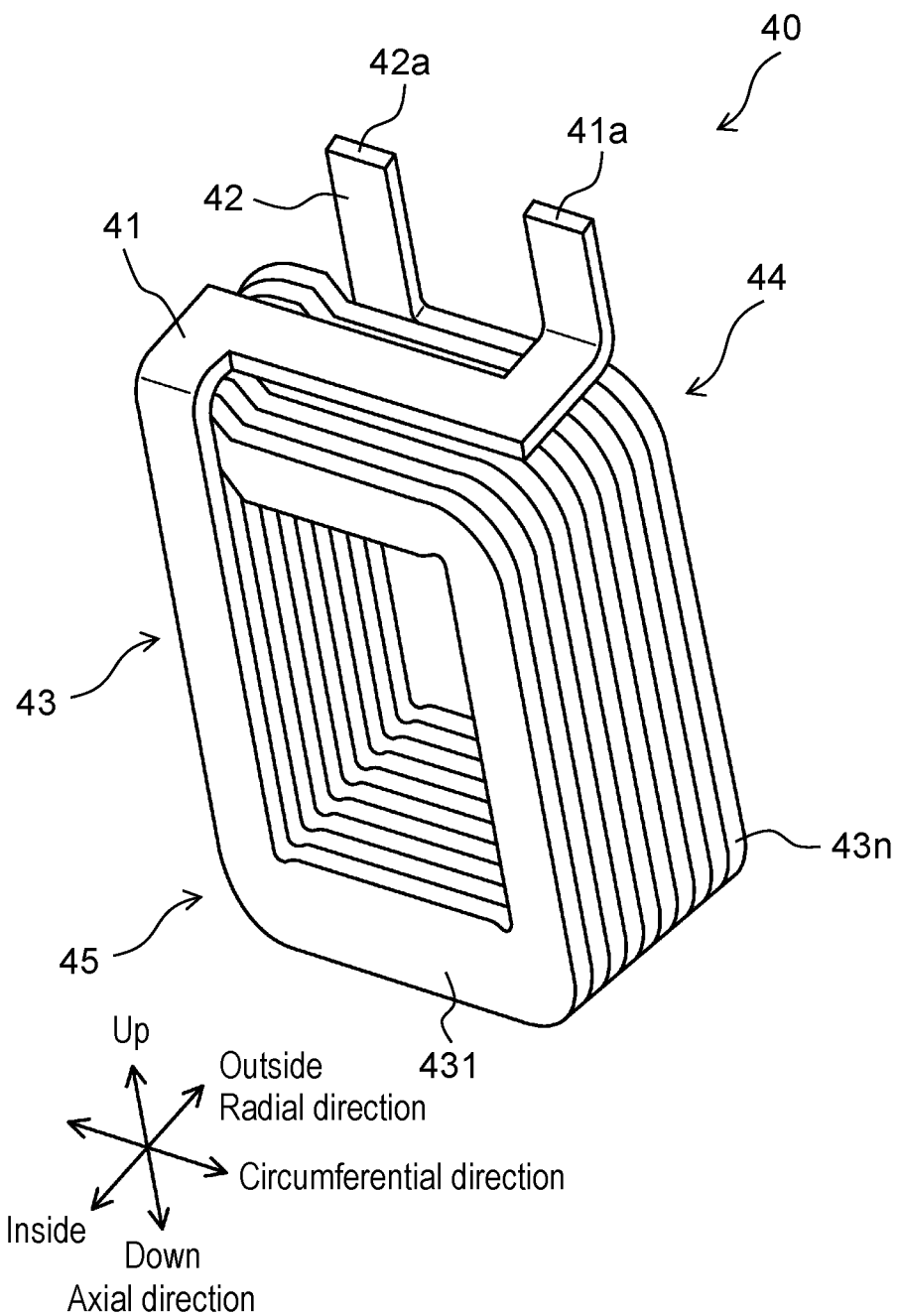
FIG. 7 is a perspective view of a coil according to a third modification.

FIG. 7 is a perspective view of a coil according to a third modification. The present modification shows a structure that is different from the structure shown in the exemplary embodiment in the following points.

First lead part 41 is bent in the circumferential direction and the radial direction above an upper surface of first coil end 44 to be located diagonally from an end of first turn 431 when viewed from the axial direction. Second lead part 42 is disposed at a predetermined interval from first lead part 41 in the circumferential direction when viewed from the axial direction.

The present modification enables positions of end 41a and end 42a in coil 40 to be interchanged with respect to coil 40 shown in the exemplary embodiment. As a result, a degree of freedom of connection between coils 40 in stator 100 can be increased. For example, when first lead parts 41 are desired to be connected to each other between coils 40 adjacent to each other, two first lead parts 41 can be brought close to each other. Thus, connecting work is facilitated. Additionally, a degree of freedom of routing wiring and a bus bar for connecting coils 40 can be increased. Thus, motor 1000 can be reduced in design cost.

As described above, coil 40 of the present modification may be configured such that first lead part 41 is bent in the circumferential direction and the radial direction about the axis line above a surface of first coil end 44, the surface being located on a first side, to be located diagonally from the end of the first turn when viewed from the axial direction, and second lead part 42 is disposed at a predetermined interval from first lead part 41 in the circumferential direction when viewed from the axial direction.

<Fourth Modification>

Figure 8:
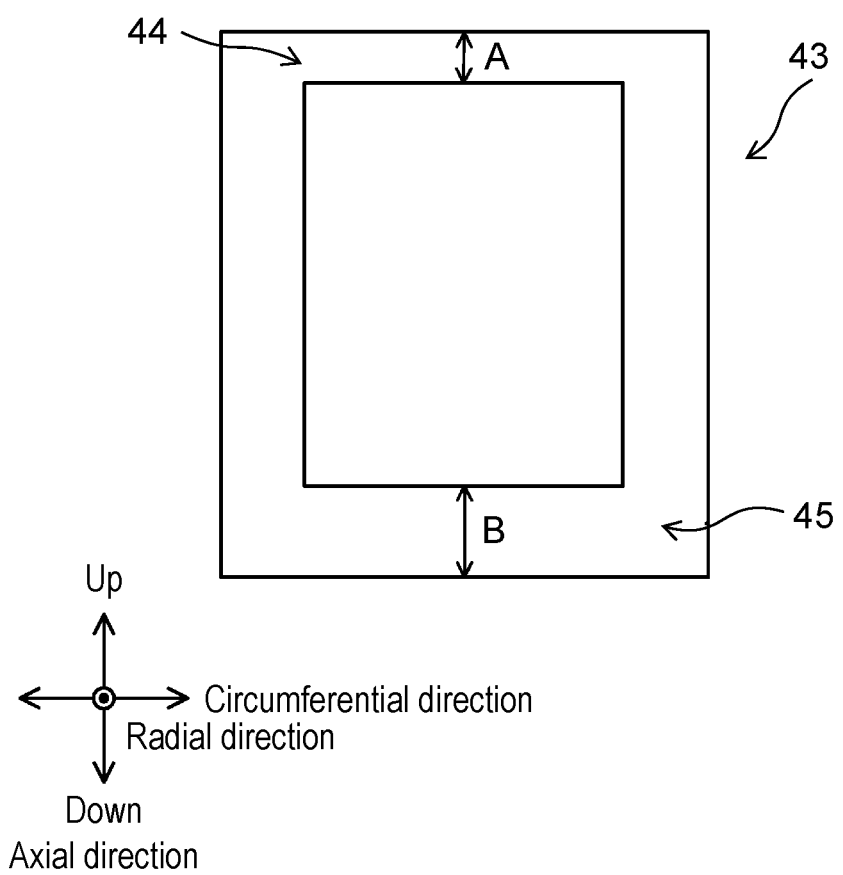
FIG. 8 is a schematic view of a winding part of a coil according to a fourth modification as viewed from a radial direction.

FIG. 8 is a schematic view of a winding part of a coil according to a fourth modification as viewed from the radial direction. FIG. 8 does not illustrate first lead part 41 and second lead part 42.

The present modification shows a structure that is different from the structure shown in the exemplary embodiment in that a height of first coil end 44, or height A in the axial direction in this case, is lower than height B of second coil end 45.

When coil 40, especially winding part 43, is formed as described above, an axial length of each of first lead part 41 and second lead part 42 can be increased to more than that in the structure shown in the exemplary embodiment without changing heights of end 41a and end 42a with respect to an upper surface of first coil end 44.

This structure enables widening a space capable of accommodating a jig or a welding head when first lead part 41 and second lead part 42 are connected to another member such as a bus bar. Thus, connecting work is facilitated.

When coil 40, especially winding part 43, is formed as described above, end 41a and end 42a can be located lower than those in the structure shown in the exemplary embodiment when the axial length of each of first lead part 41 and second lead part 42 with respect to the upper surface of first coil end 44 is not changed. As a result, coil 40 can be reduced in height and size.

As described above, coil 40 of the present modification may be configured such that first coil end 44 has an axial height lower than an axial height of second coil end 45.

Other Exemplary Embodiments

The components shown in the exemplary embodiment and the modifications described above can be appropriately combined to form an additional exemplary embodiment. For example, winding part 43 shown in the fourth modification may be applied to the structure shown in the exemplary embodiment or first to third modifications.

Although the conductive wire constituting coil 40 has a sectional shape of a quadrangle, the sectional shape is not particularly limited, and may be another shape. For example, the shape may be an m-polygon (m is an integer of three or more).

Depending on specifications of motor 1000 and stator 100, coil 40 may be connected to wiring or a bus bar below coil 40. In this case, first lead part 41 is bent to extend to n-th turn 43n along a lower surface of second coil end 45, for example. Even in this case, end 41a and end 42a are equal in height from an upper surface of first coil end 44 when viewed from the radial direction, and are equidistant from n-th turn 43n when viewed from the axial direction. This structure described above enables achieving effects similar to those achieved by the structure shown in the exemplary embodiment.

The coil of the present invention facilitates connection between coils or to a bus bar, and is useful for application to a motor.

The invention claimed is:

1. A coil attached to a motor in which a rotor rotates about an axis line as a rotation center, the coil comprising:
   a winding part including first to n-th turns stacked in this order from a center side toward an outer peripheral side of the motor when viewed from a radial direction of the motor orthogonal to the axis line, where n is an integer of 2 or more;
   a first lead part extending from the first turn; and
   a second lead part extending from the n-th turn, wherein:
   the winding part includes:
      a first coil end located on a first side in an axial direction in which the axis line extends; and
      a second coil end located on a second side in the axial direction,
   the first lead part is bent to extend to the n-th turn along and over a surface of the first coil end, the surface being located on the first side,
   the first lead part and the second lead part include respective ends that are equal in height from the surface of the first coil end, the surface being located on the first side, when viewed from the radial direction, and the respective ends being equidistant from the n-th turn when viewed from the axial direction,
   the second lead part extends toward the first side along the axial direction and includes an end located on the first side of the first coil end,
   the first lead part is further bent toward the first side near the n-th turn, and
   the first lead part is bent only twice from the first turn to an end of the first lead part.

2. A coil attached to a motor in which a rotor rotates about an axis line as a rotation center, the coil comprising:
   a winding part including first to n-th turns stacked in this order from a center side toward an outer peripheral side of the motor when viewed from a radial direction of the motor orthogonal to the axis line, where n is an integer of 2 or more;
a first lead part extending from the first turn; and
a second lead part extending from the n-th turn, wherein:
the winding part includes:
  a first coil end located on a first side in an axial direction in which the axis line extends; and
  a second coil end located on a second side in the axial direction,
the first lead part is bent at a first bent portion to extend to the n-th turn along a surface of the first coil end, the surface being located on the first side,
the first lead part and the second lead part include respective ends that are equal in height from the surface of the first coil end, the surface being located on the first side, when viewed from the radial direction, and the respective ends being equidistant from the n-th turn when viewed from the axial direction,
the second lead part is bent at a second bent portion toward the outer peripheral side of the motor near the surface of the first coil end, the surface being located on the first side,
the first lead part extends outward of the n-th turn when viewed from the radial direction, and
each of the first lead part and the second lead part includes multiple bent portions outside the n-th turn in addition to the first bent portion and the second bent portion, respectively.

3. A coil attached to a motor in which a rotor rotates about an axis line as a rotation center, the coil comprising:
a winding part including first to n-th turns stacked in this order from a center side toward an outer peripheral side of the motor when viewed from a radial direction of the motor orthogonal to the axis line, where n is an integer of 2 or more;
a first lead part extending from the first turn; and
a second lead part extending from the n-th turn, wherein:
the winding part includes:
  a first coil end located on a first side in an axial direction in which the axis line extends; and
  a second coil end located on a second side in the axial direction,
the first lead part is bent to extend to the n-th turn above a surface of the first coil end, the surface being located on the first side,
the first lead part and the second lead part include respective ends that are equal in height from the surface of the first coil end, the surface being located on the first side, when viewed from the radial direction, and the respective ends being equidistant from the n-th turn when viewed from the axial direction,
the first lead part is bent in a circumferential direction and the radial direction about the axis line above the surface of the first coil end to be located diagonally from an end of the first turn so as to overlap the first coil end when viewed from the axial direction, and
the second lead part is disposed at a predetermined interval from the first lead part in the circumferential direction when viewed from the axial direction.

4. The coil according to claim 1, wherein the first coil end has a height in the axial direction, the height being lower than a height of the second coil end in the axial direction.

5. The coil according to claim 1, wherein the first lead part is equal in thickness to the second lead part, and the first lead part is equal in width to the second lead part.

6. A stator comprising:
a yoke in an annular shape;
teeth connected to an inner periphery of the yoke; and
coils wound around the respective teeth,
the coils each being the coil according to claim 1, wherein:
first lead parts that are provided in the respective coils are disposed at equal intervals along a circumferential direction of the motor, the first lead parts being the first lead part,
second lead parts that are provided in the respective coils are disposed at equal intervals along the circumferential direction, the second lead parts being the second lead part,
the first lead parts each includes an end located at a height equal to a height of an end of each of the second lead parts when viewed from the radial direction, and
the end of each of the first lead parts and the end of each of the second lead parts are located on an identical circumference about an axial center of the yoke.

7. The stator according to claim 6, wherein each of the first lead parts and a corresponding one of the second lead parts are disposed at equal intervals.

8. A stator comprising:
a yoke in an annular shape;
teeth connected to an inner periphery of the yoke; and
coils wound around the respective teeth, wherein:
each of the coils is attached to a motor in which a rotor rotates about an axis line as a rotation center and comprises:
  a winding part including first to n-th turns stacked in this order from a center side toward an outer peripheral side of the motor when viewed from a radial direction of the motor orthogonal to the axis line, where n is an integer of 2 or more;
  a first lead part extending from the first turn; and
  a second lead part extending from the n-th turn,
the winding part includes:
  a first coil end located on a first side in an axial direction in which the axis line extends; and
  a second coil end located on a second side in the axial direction,
the first lead part is bent to extend to the n-th turn along and over a surface of the first coil end, the surface being located on the first side,
the first lead part and the second lead part include respective ends that are equal in height from the surface of the first coil end, the surface being located on the first side, when viewed from the radial direction, and the respective ends being equidistant from the n-th turn when viewed from the axial direction,
first lead parts that are provided in the respective coils are disposed at equal intervals along a circumferential direction of the motor, the first lead parts being the first lead part,
second lead parts that are provided in the respective coils are disposed at equal intervals along the circumferential direction, the second lead parts being the second lead part,
the first lead parts each includes an end located at a height equal to a height of an end of each of the second lead parts when viewed from the radial direction,
the end of each of the first lead parts and the end of each of the second lead parts are located on an identical circumference about an axial center of the yoke, coils adjacent to each other in the coils include the first coil ends facing each other and having corners each in a chamfered shape, and the first lead part is accommodated between the corners of the first coil ends facing each other and extends to the n-th turn or extends radially outward of the n-th turn.

9. A motor comprising:
a rotor provided at the axial center with an output shaft; and
the stator according to claim 6, the stator being provided coaxially with the rotor and at a predetermined interval from the rotor.

10. A coil attached to a motor in which a rotor rotates about an axis line as a rotation center, the coil comprising:
a winding part including first to n-th turns stacked in this order from a center side toward an outer peripheral side of the motor when viewed from a radial direction of the motor orthogonal to the axis line, where n is an integer of 2 or more;
a first lead part extending from the first turn; and
a second lead part extending from the n-th turn, wherein:
the winding part includes:
a first coil end located on a first side in an axial direction in which the axis line extends; and
a second coil end located on a second side in the axial direction,
the first lead part is bent to extend to the n-th turn at the first side,
the first lead part and the second lead part include respective ends that are equal in height from the surface of the first coil end, the surface being located on the first side, when viewed from the radial direction, and the respective ends being equidistant from the n-th turn when viewed from the axial direction,
the first coil end has a corner formed in a chamfered shape, and
the first lead part is bent to extend to the n-th turn along and over the corner.

* * * * *